US012138658B2

(12) United States Patent
Kurokawa et al.

(10) Patent No.: US 12,138,658 B2
(45) Date of Patent: Nov. 12, 2024

(54) ULTRASONIC TRANSDUCER

(71) Applicant: Murata Manufacturing Co., Ltd., Nagaokakyo (JP)

(72) Inventors: Fumiya Kurokawa, Nagaokakyo (JP); Yasuhiro Aida, Nagaokakyo (JP); Shinsuke Ikeuchi, Nagaokakyo (JP); Seiji Umezawa, Nagaokakyo (JP); Masayuki Suzuki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 297 days.

(21) Appl. No.: 17/894,217

(22) Filed: Aug. 24, 2022

(65) Prior Publication Data

US 2022/0401994 A1 Dec. 22, 2022

Related U.S. Application Data

(63) Continuation of application No. PCT/JP2020/044434, filed on Nov. 30, 2020.

(30) Foreign Application Priority Data

Mar. 26, 2020 (JP) ................................ 2020-056416

(51) Int. Cl.
*B06B 1/02* (2006.01)
*G10K 11/02* (2006.01)

(52) U.S. Cl.
CPC ............ *B06B 1/0292* (2013.01); *G10K 11/02* (2013.01)

(58) Field of Classification Search
None
See application file for complete search history.

(56) References Cited

U.S. PATENT DOCUMENTS

2010/0251823 A1 10/2010 Adachi et al.
2020/0112799 A1* 4/2020 Kuntzman ............... H04R 7/18

FOREIGN PATENT DOCUMENTS

JP 2015041861 A 3/2015
JP 2019193130 A 10/2019
(Continued)

OTHER PUBLICATIONS

International Search Report in PCT/JP2020/044434, mailed Feb. 22, 2021, 3 pages.
(Continued)

*Primary Examiner* — Luke D Ratcliffe
*Assistant Examiner* — Jonathan D Armstrong
(74) *Attorney, Agent, or Firm* — Keating & Bennett, LLP

(57) ABSTRACT

An ultrasonic transducer includes first and second acoustic transducers and a housing with a bottomed tubular shape. The second acoustic transducer includes an annular section supporting a second membrane section and contacting an entire periphery of the second membrane section, and an acoustic matching plate facing the second membrane section and spaced apart from the second membrane section. The acoustic matching plate is connected to a surrounding wall portion defining a sealed space with the housing. An ultrasonic transmission path sandwiched between the first membrane section and the second membrane section is provided in the sealed space. A maximum inner width of the ultrasonic transmission path is smaller than a maximum inner width of the surrounding wall portion.

19 Claims, 5 Drawing Sheets

(56) References Cited

FOREIGN PATENT DOCUMENTS

| | | | |
|---|---|---|---|
| WO | 2010053032 | A1 | 5/2010 |
| WO | 2015011956 | A1 | 1/2015 |

OTHER PUBLICATIONS

Written Opinion in PCT/JP2020/044434, mailed Feb. 22, 2021, 3 pages.

Bok et al., "Metasurface for Water-to-Air Sound Transmission", American Physical Society, Physical Review Letters 120, 044302, Jan. 26, 2018, pp. 1-6.

* cited by examiner

ULTRASONIC TRANSDUCER

CROSS REFERENCE TO RELATED APPLICATIONS

This application claims the benefit of priority to Japanese Patent Application No. 2020-056416 filed on Mar. 26, 2020 and is a Continuation Application of PCT Application No. PCT/JP2020/044434 filed on Nov. 30, 2020. The entire contents of each application are hereby incorporated herein by reference.

BACKGROUND OF THE INVENTION

1. Field of the Invention

The present invention relates to an ultrasonic transducer.

2. Description of the Related Art

Japanese Unexamined Patent Application Publication No. 2019-193130 discloses an ultrasonic sensor including an acoustic matching layer. The ultrasonic sensor described in Japanese Unexamined Patent Application Publication No. 2019-193130 includes a piezoelectric element and the acoustic matching layer. The piezoelectric element is bonded to an inner surface of a top plate of a bottomed tubular metal housing, and an open end thereof is sealed with a terminal plate. The acoustic matching layer is bonded to an outer surface of the top plate of the housing.

The acoustic matching layer is used for highly efficient acoustic propagation between media having acoustic impedance values greatly different from each other. In general, the acoustic impedance of a substance is determined by the product of the density of the substance and the acoustic velocity in the substance. When the difference in acoustic impedance between substances different from each other is small, sound is propagated by transmitting ultrasonic waves through an interface between the substances different from each other. On the other hand, when the difference in acoustic impedance between substances different from each other is large, ultrasonic waves are reflected at an interface between the substances different from each other. That is, as the difference in acoustic impedance at the interface between substances different from each other increases, the efficiency of acoustic energy transfer decreases.

Thus, as described in Japanese Unexamined Patent Application Publication No. 2019-193130, an acoustic matching layer is used to reduce the difference in acoustic impedance at the interface between the piezoelectric element and air. Specifically, the piezoelectric element is typically made of a ceramic. The density of a ceramic is extremely high compared to the density of air, and the acoustic velocity in a ceramic is extremely high compared to the acoustic velocity in air. Thus, the efficiency of acoustic energy transfer from the piezoelectric element to air is very low. In order to overcome this problem, an acoustic matching layer having an intermediate acoustic impedance value between acoustic impedance values of the piezoelectric element and air is interposed between the piezoelectric element and air to increase the efficiency of acoustic energy transfer.

Physical Review Letters 120, 044302 (2018) is an earlier document disclosing an acoustic matching structure. The acoustic matching structure described in Physical Review Letters 120, 044302 (2018) includes a first membrane section and a second membrane section.

In the ultrasonic sensor described in Japanese Unexamined Patent Application Publication No. 2019-193130, since the piezoelectric element is bonded to the top plate of the housing, the top plate interferes with deformation of the piezoelectric element, thus causing a decrease in the sound pressure of ultrasonic waves. In the acoustic matching structure described in Physical Review Letters 120, 044302 (2018), since an ultrasonic transmission path is formed by a surrounding wall portion, the propagation distance of ultrasonic waves increases, thus increasing the propagation attenuation of the ultrasonic waves. Even when a structural body of the acoustic matching structure is miniaturized, the loss due to the propagation distance cannot be minimized because an inner diameter of the ultrasonic transmission path is larger than an outer diameter of the membrane section for propagating ultrasonic waves to a high impedance side.

SUMMARY OF THE INVENTION

Preferred embodiments of the present invention provide ultrasonic transducers each having high efficiency by reducing or preventing propagation attenuation of ultrasonic waves by making a structural body of the acoustic transducer larger than an ultrasonic transmission path and further shortening a propagation distance of the ultrasonic waves while ensuring a large amount of displacement of a membrane section by using a structure that does not interfere with the deformation of the membrane section of the acoustic transducer.

An ultrasonic transducer according to a preferred embodiment of the present invention includes a first acoustic transducer, a second acoustic transducer, and a housing with a bottomed tubular shape. The first acoustic transducer includes a first membrane section to perform flexural vibration. The second acoustic transducer includes a second membrane section facing the first membrane section and spaced apart from the first membrane section. The second membrane section is structured to vibrate in a thickness direction. The housing includes a bottom portion facing the first membrane section and spaced apart from the first membrane section in the thickness direction, and a surrounding wall portion surrounding the first membrane section and the second membrane section and spaced apart from each of the first membrane section and the second membrane section. The second acoustic transducer further includes an annular section supporting the second membrane section and in contact with an entire or substantially an entire periphery of the second membrane section, and an acoustic matching plate facing the second membrane section and spaced apart from the second membrane section. The acoustic matching plate is connected to the surrounding wall portion to define a sealed space with the housing. An ultrasonic transmission path sandwiched between the first membrane section and the second membrane section is provided in the sealed space. A maximum inner width of the ultrasonic transmission path is smaller than maximum inner widths of the surrounding wall portion, the first membrane section, and the second membrane section.

According to preferred embodiments of the present invention, acoustic transducers are each able to be made highly efficient by reducing or preventing propagation attenuation of ultrasonic waves by shortening the propagation distance of the ultrasonic waves while ensuring a large amount of displacement of the membrane section by using a structure that does not interfere with the deformation of the membrane section of the acoustic transducer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
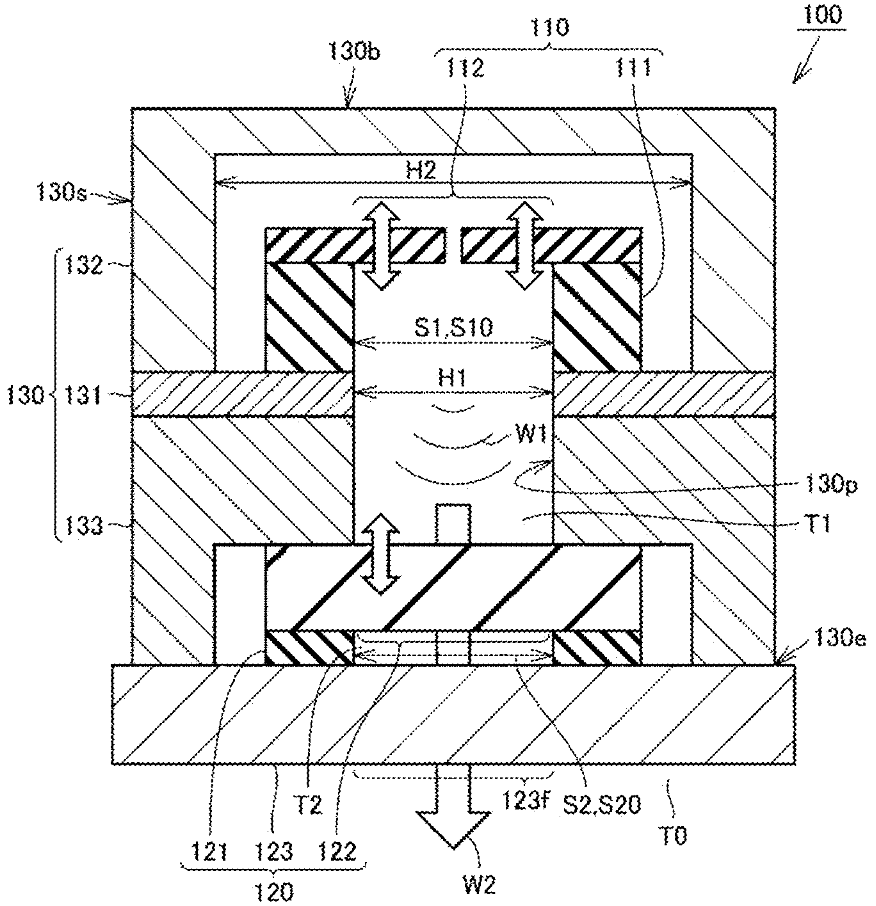
FIG. 1 is a longitudinal sectional view illustrating a configuration of an ultrasonic transducer according to Preferred embodiment 1 of the present invention.

Hereinafter, ultrasonic transducers according to preferred embodiments of the present invention will be described with reference to the drawings. In the following description of the preferred embodiments, the same or corresponding portions in the drawings are denoted by the same symbols, and description thereof will not be repeated.

Preferred Embodiment 1

FIG. 1 is a longitudinal sectional view illustrating a configuration of an ultrasonic transducer according to Preferred embodiment 1 of the present invention. As illustrated in FIG. 1, an ultrasonic transducer 100 according to Preferred embodiment 1 of the present invention includes a first acoustic transducer 110, a second acoustic transducer 120, and a housing 130 having a bottomed tubular shape.

The first acoustic transducer 110 includes a first membrane section 112 configured to perform flexural vibration. The first acoustic transducer 110 includes, for example, an oscillator made of a ceramic or a small mechanical oscillator (micro-electro-mechanical systems (MEMS)) manufactured by applying a microfabrication process to a semiconductor material such as Si and a functional thin film. The first acoustic transducer 110 can transmit and receive ultrasonic waves by vibration of the first membrane section 112. As a driving source to vibrate the first membrane section 112, a piezoelectric effect, an electrostatic force, an electromagnetic force, or the like may be used, for example. In order to obtain high propagation efficiency in the ultrasonic transducer 100, it is necessary to make the propagation path of ultrasonic waves smaller and to reduce the propagation loss of the ultrasonic waves. For this, it is effective to make the first acoustic transducer 110 smaller. Thus, it is preferable to use a MEMS element that can be easily miniaturized as the first acoustic transducer 110.

The first acoustic transducer 110 includes the first membrane section 112 and a base section 111 having an annular shape that supports the first membrane section 112 while being in contact with an entire or substantially an entire periphery of the first membrane section 112. The base section 111 is made of, for example, Si or silicon on insulator (SOI).

The first membrane section 112 is a portion of the multilayer thin film provided on the base section 111 that extends inward from an inner edge of the base section 111. The total thickness of the stacked thin film layers is, for example, about 10 μm or less. A material of the multilayer thin film depends on the drive system of the first membrane section 112. For example, for a piezoelectric drive system, the multilayer thin film is made of PZT, AlN, lithium niobate, lithium tantalate, or the like. In this case, the multilayer thin film further includes an electrode wire to apply a voltage to the piezoelectric material.

When viewed from the thickness direction of the first membrane section 112, an area of an outer shape of the first membrane section 112 is S10. When the first membrane section 112 is piezoelectrically driven, flexural vibration is excited in the first membrane section 112 by applying a voltage to a piezoelectric material. An inner diameter S1 of the first membrane section 112 is, for example, about 0.7 mm to about 1.0 mm. The outer shape of the first membrane section 112 is not limited to a circular or substantially circular shape, but may be a rectangular or substantially rectangular shape, for example. Thus, in the present description, the inner diameter is the length of the shortest line segment that passes through the center between the inner surfaces and connects the inner surfaces to each other.

A slit is provided in the first membrane section 112.

Accordingly, the residual stress in the first membrane section 112 is reduced. The first membrane section 112 can vibrate at a relatively low frequency because the residual stress generated in the film forming step and the processing step of the thin film layer is reduced. To be more specific, the first membrane section 112 is configured to perform flexural vibration in a low frequency range from about 20 kHz to about 60 kHz, for example, in the vicinity of a mechanical resonant frequency of about 40 kHz. As a result, the first acoustic transducer 110 can transmit and receive relatively low frequency ultrasonic waves.

Further, when a width of the slit in the first membrane section 112 is narrow, for example, when the width of the slit in the first membrane section 112 is about 10 μm or less, the ultrasonic waves generated by the flexural vibration of the first membrane section 112 do not pass through the slit. Accordingly, it is possible to reduce or prevent attenuation of ultrasonic waves generated on a second membrane section 122 (described below) side of the first membrane section 112 in the thickness direction due to interference with ultrasonic waves of an opposite phase generated on an opposite side from the second membrane section 122 side of the first membrane section 112 in the thickness direction. When the width of the slit in the first membrane section 112 is wide, ultrasonic waves of opposite phases to each other generated on both sides of the first membrane section 112 in the thickness direction interfere with each other, thus reducing the transmission and reception efficiency of the ultrasonic transducer 100.

The second acoustic transducer 120 includes a second membrane section 122 that faces the first membrane section

112 while being spaced apart from the first membrane section 112 and is capable of vibrating in the thickness direction of the first membrane section 112. The second acoustic transducer 120 further includes an annular section 121 that supports the second membrane section 122 while being in contact with an entire or substantially an entire periphery of the second membrane section 122. The annular section 121 is made of, for example, a metal, a semiconductor, a resin, or the like, and the material of the annular section 121 is selected from the viewpoint of processability and acoustic impedance matching. Here, processability means the ease of processing in a semiconductor microfabrication process. Acoustic impedance matching means that the acoustic impedance of the second acoustic transducer 120 is as close as possible to the acoustic impedance of a medium external to the ultrasonic transducer 100. As a material of the annular section 121, for example, Si, Al, or the like, which is a material having both processability and acoustic impedance matching, is preferable.

The second membrane section 122 is a portion of a thin film provided on the annular section 121 that extends inward from an inner edge of the annular section 121. Since no electric wire is provided in the second membrane section 122, the second membrane section 122 cannot vibrate actively. The second membrane section 122 is made of, for example, a metal, a semiconductor, a resin, or the like. From the viewpoint of processability and acoustic impedance matching, for example, Si or Al is preferably used as a material of the second membrane section 122. Further, the material of the annular section 121 and the material of the second membrane section 122 may be different from each other.

The second acoustic transducer 120 further includes an acoustic matching plate 123 facing the second membrane section 122 while being spaced apart from the second membrane section 122. The acoustic matching plate 123 has a flat plate shape. The acoustic matching plate 123 is made of, for example, a metal, a semiconductor, a resin, or the like. From the viewpoint of acoustic impedance matching and reliability against disturbance in an external medium, as a material of the acoustic matching plate 123, a material having high rigidity, such as, for example, Al or polypropylene, is preferable. Disturbance in an external medium is, for example, high pressure water or stones flying at high speed when the ultrasonic transducer 100 is attached to a bumper of a vehicle.

The acoustic matching plate 123 sandwiches the annular section 121 with the second membrane section 122. That is, a distance between a facing portion **123*f* in the acoustic matching plate 123 facing the second membrane section 122 and the second membrane section 122 is defined by a thickness of the annular section 121. The acoustic matching plate 123 and the annular section 121 are connected to each other with an adhesive such as, for example, a die bond adhesive. This provides a medium sealing portion T2 that is sandwiched between the second membrane section 122 and the facing portion 123*f* of the acoustic matching plate 123** and in which a gas or liquid medium is sealed.

The second acoustic transducer 120 is a MEMS element having a small mechanical oscillator structure fabricated by a microfabrication process. The second acoustic transducer 120 has a function of adjusting the acoustic impedance in a propagation path of ultrasonic waves from the first acoustic transducer 110 to an external space T0 to reduce or prevent attenuation of ultrasonic waves transmitted to and received from the first acoustic transducer 110.

The housing 130 includes a bottom portion **130*b* facing the first membrane section 112 while being spaced apart from the first membrane section 112 in the thickness direction of the first membrane section 112, and a surrounding wall portion 130*s* surrounding the first membrane section 112 and the second membrane section 122 while being spaced apart from each of the first membrane section 112 and the second membrane section 122. The housing 130 further includes a protruding portion 130*p* having an annular shape that protrudes inward from the surrounding wall portion 130*s*. The housing 130 further includes an opening end 130*e* on an opposite side from a bottom portion 130*b*** side.

In the present preferred embodiment, the housing 130 includes an annular plate section 131, a bottomed tubular section 132, and a tubular section 133, and has a bottomed tubular shape as a whole. The annular plate section 131 is sandwiched between the bottomed tubular section 132 and the tubular section 133. An end portion of the tubular section 133 on an annular plate section 131 side protrudes inward.

In the present preferred embodiment, the bottom portion **130*b* of the housing 130 is defined by the bottomed tubular section 132. The surrounding wall portion 130*s* of the housing 130 includes the annular plate section 131, the bottomed tubular section 132, and the tubular section 133. The protruding portion 130*p* of the housing 130 includes the annular plate section 131 and the tubular section 133. The annular plate section 131, the bottomed tubular section 132, and the tubular section 133 are bonded to each other with a bonding material such as, for example, solder or an adhesive so as to have liquid tightness. The housing 130 is made of, for example, a metal, a semiconductor, a resin, or the like. From the viewpoint of acoustic impedance matching and reliability against disturbance in an external medium, as a material of the housing 130**, a material having high rigidity, such as, for example, Al or polypropylene, is preferable.

The first acoustic transducer 110 is mounted on the protruding portion **130*p* of the housing 130 on the bottom portion 130*b* side. A surface of the annular plate section 131 on a bottomed tubular section 132 side is in contact with the base section 111**.

The second acoustic transducer 120 is mounted on the protruding portion **130*p* of the housing 130 on an opening end 130*e* side. The tubular section 133 and the thin film forming the second membrane section 122** are in contact with each other.

The acoustic matching plate 123 and the opening end **130*e* of the housing 130 are bonded to each other with a bonding material such as, for example, solder or an adhesive so as to have liquid tightness. Thus, the acoustic matching plate 123 is connected to the surrounding wall portion 130*s* of the housing 130 to define a sealed space with the housing 130**.

An ultrasonic transmission path T1 sandwiched between the first membrane section 112 and the second membrane section 122 is provided in the sealed space. In the present preferred embodiment, the ultrasonic transmission path T1 is a region surrounded by the first membrane section 112, the second membrane section 122, the base section 111, and the protruding portion **130*p* of the housing 130**.

A maximum inner width H1 of the ultrasonic transmission path T1 is smaller than a maximum inner width H2 of the surrounding wall portion **130*s* of the housing 130. The maximum inner width is a maximum inner width in a plane parallel or substantially parallel to the first membrane section 112. Thus, the position at which the maximum inner width is defined changes in both the thickness direction and the radial direction of the first membrane section 112**.

Here, a non-limiting example of a method of manufacturing the ultrasonic transducer 100 according to Preferred embodiment 1 of the present invention will be described.

The first acoustic transducer 110 and the second acoustic transducer 120 are formed by photolithography, etching, or the like. After the first acoustic transducer 110 is die-bonded onto the annular plate section 131, the bottomed tubular section 132 is bonded onto the annular plate section 131 with a bonding material such as solder, for example.

After the second acoustic transducer 120 is mounted onto the tubular section 133 by, for example, die bonding, flip chip bonding, or the like, the annular plate section 131 and the tubular section 133 are bonded to each other with a bonding material such as solder, for example. At this time, the ultrasonic transmission path T1 is filled with a gas or liquid medium.

By the steps described above, the ultrasonic transducer 100 according to Preferred embodiment 1 of the present invention is manufactured.

Figure 2:
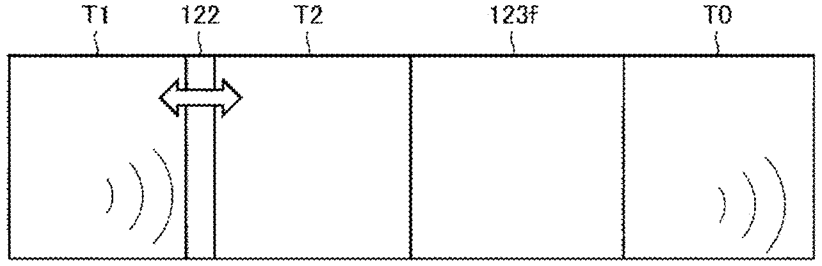
FIG. 2 is a diagram schematically illustrating a configuration located in a propagation path of ultrasonic waves in the ultrasonic transducer according to Preferred embodiment 1 of the present invention.

Hereinafter, the operation of the ultrasonic transducer 100 according to Preferred embodiment 1 of the present invention will be described. FIG. 2 is a diagram schematically illustrating a configuration located in the propagation path of ultrasonic waves in the ultrasonic transducer according to Preferred embodiment 1 of the present invention.

As illustrated in FIG. 1, in the initial stage, ultrasonic waves W1 transmitted from the first acoustic transducer 110 are reflected at an interface between the second membrane section 122 and the ultrasonic transmission path T1, and at an interface between the acoustic matching plate 123 and the medium sealing portion T2. When the second membrane section 122 starts to vibrate upon receiving the ultrasonic waves W1, the second membrane section 122 starts to transmit ultrasonic waves in the thickness direction of the second membrane section 122, thereby canceling the reflected waves from the interfaces. Accordingly, the ultrasonic waves propagate in the same direction as the direction in which the ultrasonic waves are transmitted from the first membrane section 112, and as illustrated in FIGS. 1 and 2, the ultrasonic waves propagate through the acoustic matching plate 123 to the external space T0.

Ultrasonic waves W2 propagated to the external space T0 are reflected by an object to be detected, propagate in the reverse order to the above, and are received by exciting the vibration of the first membrane section 112.

Here, when ultrasonic waves propagate between members different from each other, an energy transfer rate is determined by acoustic impedance values of the respective members. Since the acoustic impedance value is uniquely determined by the density and rigidity of the material of the member, the materials that can be used to obtain highly efficient acoustic propagation are limited. However, in the ultrasonic transducer 100 according to Preferred embodiment 1 of the present invention, by providing the second acoustic transducer 120 that propagates ultrasonic waves by vibrating the second membrane section 122 in the path through which ultrasonic waves propagate, the acoustic impedance value can be widely set not only by material selection but also by structural design.

To be more specific, the acoustic impedance value can be adjusted by changing either the mass of the second membrane section 122 or the distance between the second membrane section 122 and the facing portion **123*f***.

For example, when the ultrasonic transmission path T1 is filled with air and the medium of the external space T0 is also air, the acoustic impedance values of the ultrasonic transmission path T1 and the external space T0 are represented by Za. When the acoustic impedance value of the second acoustic transducer 120 is represented by Zm, a reflectance (Ra-m) when the ultrasonic waves generated by the first acoustic transducer 110 propagate from the ultrasonic transmission path T1 to the external space T0 is $(Zm-Za)/(Zm+Za)$.

Figure 3:
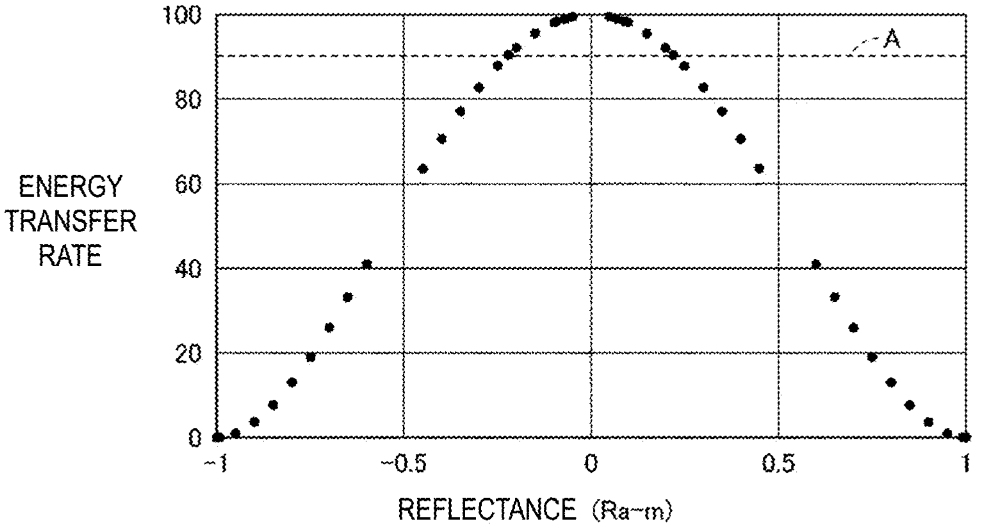
FIG. 3 is a graph showing a relationship between a reflectance and an energy transfer rate when ultrasonic waves propagate from an ultrasonic transmission path to an external space.

FIG. 3 is a graph showing a relationship between the reflectance (Ra-m) and the energy transfer rate when ultrasonic waves propagate from the ultrasonic transmission path T1 to the external space T0. In FIG. 3, the horizontal axis represents the reflectance (Ra-m) when the ultrasonic waves propagate from the ultrasonic transmission path T1 to the external space T0, and the vertical axis represents the energy transfer rate when the ultrasonic waves propagate from the ultrasonic transmission path T1 to the external space T0.

As shown in FIG. 3, when an absolute value of the reflectance (Ra-m) is about 0.22 or less, the energy transfer rate is in a range of about 90% or more, which is above a dotted line A in FIG. 3. At this time, the energy transfer rate from transmission to reception of the ultrasonic waves is about 80% or more. Thus, from the relationship between the reflectance (Ra-m) and the acoustic impedance values Za and Zm, $Za/1.6<Zm<1.6Za$ is satisfied.

When the acoustic impedance values Za and Zm do not satisfy the above-described relational inequality, the sensitivity of the ultrasonic transducer 100 is decreased, thus shortening a detectable distance to the object to be detected. In order to compensate for this decrease in sensitivity, it is necessary to increase the amount of deformation of the first membrane section 112 by applying a large voltage to the piezoelectric material of the first membrane section 112 in order to increase ultrasonic waves generated by the first acoustic transducer 110. At this time, the large deformation of the first membrane section 112 during driving may reduce the mechanical reliability of the oscillator included in the first acoustic transducer 110, and the application of a large voltage may cause thermal energy loss. Accordingly, it is preferable that the acoustic impedance values Za and Zm satisfy the above relational inequality.

When the acoustic impedance values Za and Zm satisfy the above relational inequality, the combined acoustic impedance value of the medium filling the sealed space between the housing 130 and the acoustic matching plate 123 and the second acoustic transducer 120 is, for example, about 1/1.6 times or more and about 1.6 times or less the acoustic impedance value of air Za.

For example, when the sealed space between the housing 130 and the acoustic matching plate 123 is filled with air, the external space T0 is also filled with air, the acoustic matching plate 123 is made of Al, the second membrane section 122 is made of an SOI active layer, and the annular section 121 is made of an SOI support substrate, by setting the thickness of the second membrane section 122 to about 144 μm and the distance between the second membrane section 122 and the facing portion **123*f*** to about 6.69 μm, an energy transfer rate of about 90% or more can be ensured for sound waves in the ultrasonic band of about 40 kHz.

In the ultrasonic transducer 100 according to

Preferred embodiment 1 of the present invention, the first membrane section 112 of the first acoustic transducer 110 faces the bottom portion **130*b* of the housing 130 while being spaced apart from the bottom portion 130*b* and is surrounded by the surrounding wall portion 130*s* while being spaced apart from the surrounding wall portion 130*s*. Thus, a large amount of displacement of the first membrane section 112 can be ensured. In addition, since the maximum inner width H1 of the ultrasonic transmission path T1 is smaller than each of the maximum inner width H2 of the surrounding wall portion 130***s*, the inner diameter S1 of the first membrane section 112, and the inner diameter S2 of the second membrane section 122, it is possible to reduce or prevent propagation attenuation of ultrasonic waves due to an increase in the propagation distance of ultrasonic waves. As a result, the efficiency of the ultrasonic transducer 100 can be made higher.

In the ultrasonic transducer 100 according to Preferred embodiment 1 of the present invention, since the first acoustic transducer 110 is a MEMS element, a thin multilayer thin film can be provided, so that relatively low ultrasonic waves can be propagated and the ultrasonic transducer 100 can be miniaturized.

In the ultrasonic transducer 100 according to Preferred embodiment 1 of the present invention, since the combined acoustic impedance value of the medium filling the sealed space between the housing 130 and the acoustic matching plate 123 and the second acoustic transducer 120 is, for example, about 1/1.6 times or more and about 1.6 times or less the acoustic impedance value of air, it is possible to transmit and receive ultrasonic waves with low loss by acoustic impedance matching between the sealed space and the external space T0.

Preferred Embodiment 2

Hereinafter, an ultrasonic transducer according to Preferred embodiment 2 of the present invention will be described with reference to the drawings. The ultrasonic transducer according to Preferred embodiment 2 of the present invention is different from the ultrasonic transducer 100 according to Preferred embodiment 1 of the present invention mainly in that a recessed portion is provided in an acoustic matching plate. Thus, the description of the configuration the same as or similar to that of the ultrasonic transducer 100 according to Preferred embodiment 1 of the present invention will not be repeated.

Figure 4:
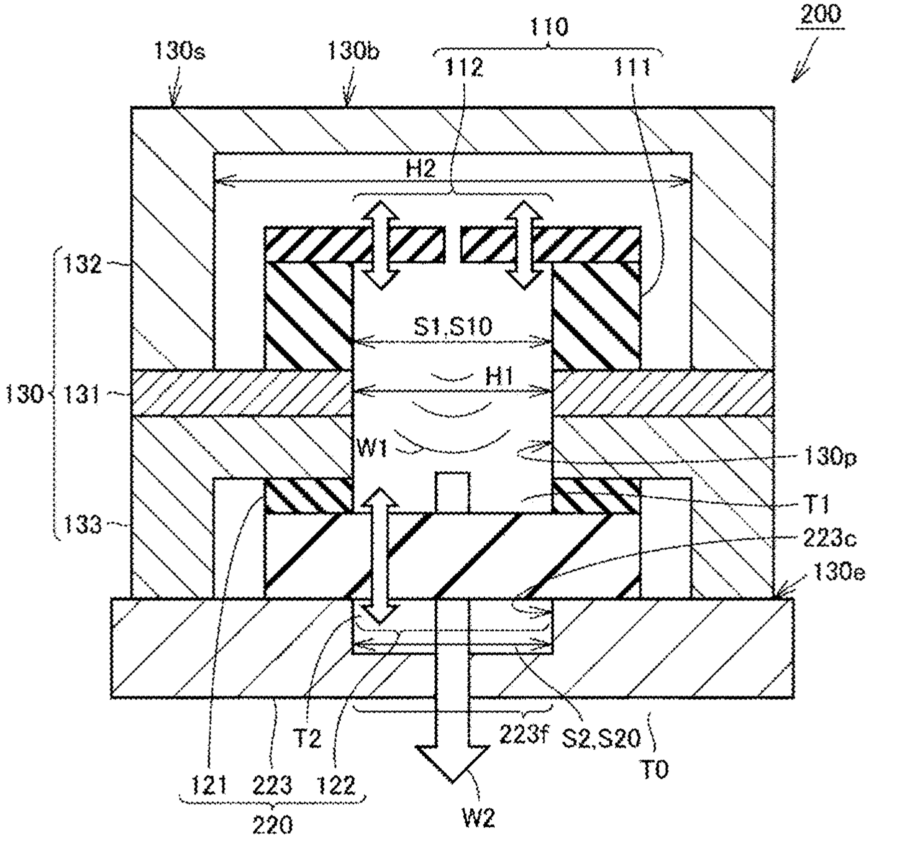
FIG. 4 is a longitudinal sectional view illustrating a configuration of an ultrasonic transducer according to Preferred embodiment 2 of the present invention.

FIG. 4 is a longitudinal sectional view illustrating a configuration of the ultrasonic transducer according to Preferred embodiment 2 of the present invention. As illustrated in FIG. 4, in a second acoustic transducer 220 of an ultrasonic transducer 200 according to Preferred embodiment 2 of the present invention, an acoustic matching plate 223 includes a recessed portion 223*c* provided at a position facing a second membrane section 122. That is, a distance between a facing portion 223*f* facing the second membrane section 122 in the acoustic matching plate 223 and the second membrane section 122 is defined by a depth of the recessed portion 223*c*. The recessed portion 223*c* in the acoustic matching plate 223 is formed by, for example, etching, machining, or the like.

The acoustic matching plate 223 and a thin film defining the second membrane section 122 are connected to each other with an adhesive such as a die bond adhesive, for example. This defines a medium sealing portion T2 that is sandwiched between the second membrane section 122 and the facing portion 223*f* in the acoustic matching plate 223 and in which a gas or liquid medium is sealed.

Also in the ultrasonic transducer 200 according to Preferred embodiment 2 of the present invention, the ultrasonic transducer 200 can be made highly efficient by reducing or preventing attenuation of ultrasonic waves while ensuring a large amount of displacement of the first membrane section 112.

In the ultrasonic transducer 200 according to Preferred embodiment 2 of the present invention, the acoustic matching plate 223 includes the recessed portion 223*c* provided at the position facing the second membrane section 122, so that the dimension of the distance between the second membrane section 122 and the facing portion 223*f* is the same or substantially the same as the dimension of the depth of the recessed portion 223*c*. In this structure, the mass of the second membrane section 122 and the distance between the second membrane section 122 and the facing portion 223*f* in the acoustic matching plate 223, which are related to the acoustic impedance, can be adjusted by separate types of processing. Thus, the mass of the second membrane section 122 and the distance between the second membrane section 122 and the facing portion 223*f* in the acoustic matching plate 223 can be adjusted separately, so that the adjustable range of the acoustic impedance value by the second acoustic transducer 220 can be increased.

Preferred Embodiment 3

Hereinafter, an ultrasonic transducer according to Preferred embodiment 3 of the present invention will be described with reference to the drawings. The ultrasonic transducer according to Preferred embodiment 3 of the present invention is different from the ultrasonic transducer 100 according to Preferred embodiment 1 of the present invention in that a second membrane section 122 and an annular section 121 of a second acoustic transducer 120 are defined by the same member. Thus, the description of the configuration the same as or similar to that of the ultrasonic transducer 100 according to Preferred embodiment 1 of the present invention will not be repeated.

Figure 5:
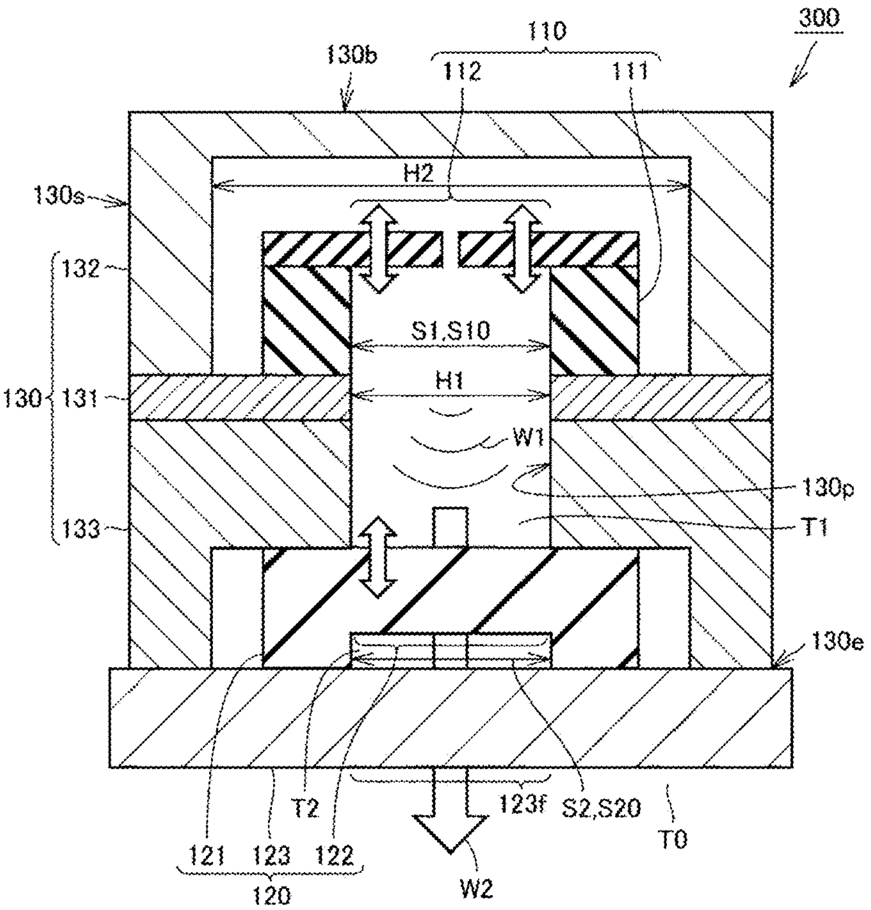
FIG. 5 is a longitudinal sectional view illustrating a configuration of an ultrasonic transducer according to Preferred embodiment 3 of the present invention.

FIG. 5 is a longitudinal sectional view illustrating a configuration of the ultrasonic transducer according to Preferred embodiment 3 of the present invention. As illustrated in FIG. 5, in the second acoustic transducer 120 of an ultrasonic transducer 300 according to Preferred embodiment 3 of the present invention, the second membrane section 122 and the annular section 121 are formed by processing a single material. As a result, the second membrane section 122 and the annular section 121 are defined by the same member, so that occurrence of peeling at an interface between the second membrane section 122 and the annular section 121 is reduced or prevented, thus improving reliability. Further, the second membrane section 122 and the annular section 121 can be easily formed by, for example, etching or the like.

Preferred Embodiment 4

Hereinafter, an ultrasonic transducer according to Preferred embodiment 4 of the present invention will be described with reference to the drawings. The ultrasonic transducer according to Preferred embodiment 4 of the present invention is different from the ultrasonic transducer 300 according to Preferred embodiment 3 of the present invention in that an area S20 of an outer shape of a second membrane section 122 is larger than an area S10 of an outer shape of a first membrane section 112. Thus, the description of the configuration the same as or similar to that of the ultrasonic transducer 300 according to Preferred embodiment 3 of the present invention will not be repeated.

Figure 6:
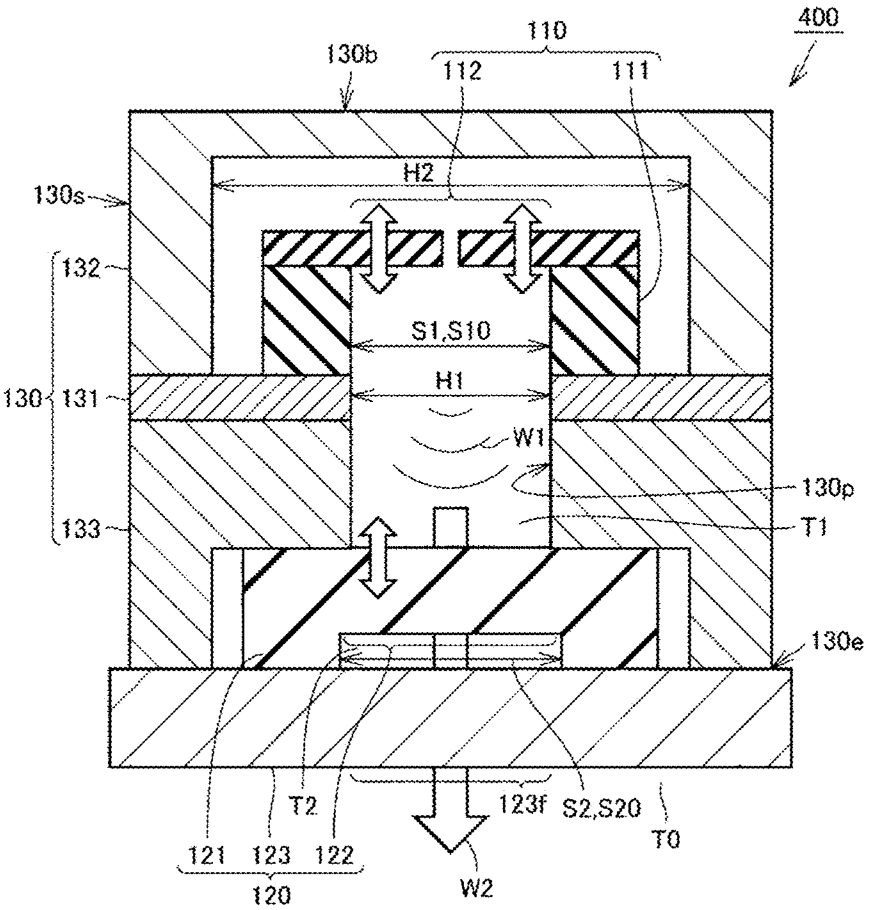
FIG. 6 is a longitudinal sectional view illustrating a configuration of an ultrasonic transducer according to Preferred embodiment 4 of the present invention.

FIG. 6 is a longitudinal sectional view illustrating a configuration of the ultrasonic transducer according to Preferred embodiment 4 of the present invention. As illustrated in FIG. 6, in an ultrasonic transducer 400 according to Preferred embodiment 4 of the present invention, when viewed from a thickness direction of the second membrane section 122, the area S20 of the outer shape of the second membrane section 122 of a second acoustic transducer 120 is larger than the area S10 of the outer shape of the first membrane section 112 of a first acoustic transducer 110. This allows all of the acoustic energy of ultrasonic waves W1 transmitted from the first membrane section 112 to be received by the second membrane section 122, thus reducing the propagation loss of the ultrasonic waves.

Preferred Embodiment 5

Hereinafter, an ultrasonic transducer according to Preferred embodiment 5 of the present invention will be described with reference to the drawings. The ultrasonic transducer according to Preferred embodiment 5 of the present invention is different from the ultrasonic transducer 400 according to Preferred embodiment 4 of the present invention mainly in a configuration of a housing. Thus, the description of the configuration the same as or similar to that of the ultrasonic transducer 400 according to Preferred embodiment 4 of the present invention will not be repeated.

Figure 7:
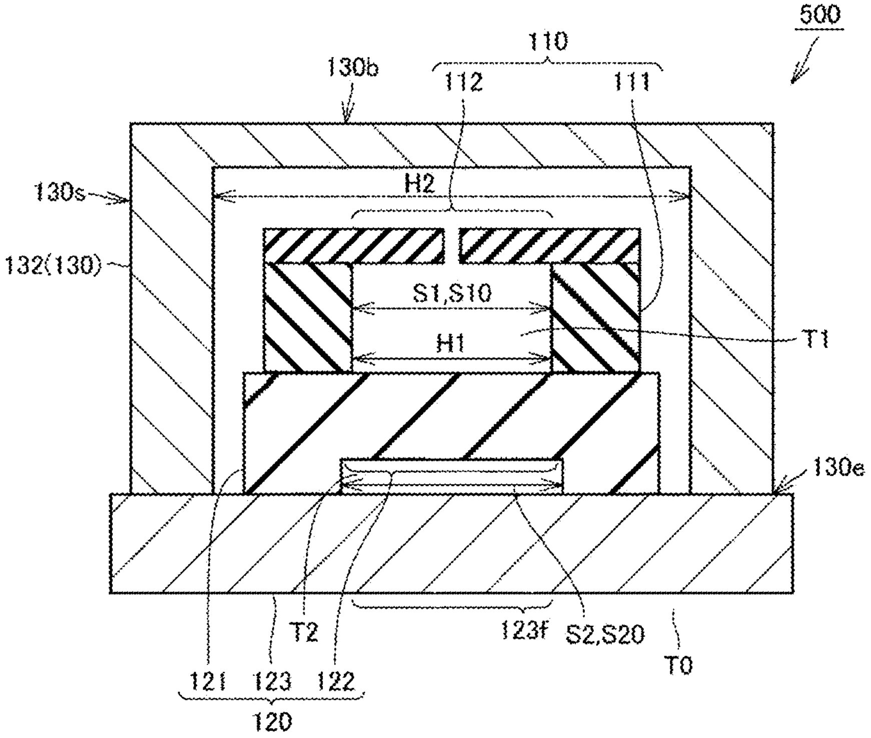
FIG. 7 is a longitudinal sectional view illustrating a configuration of an ultrasonic transducer according to Preferred embodiment 5 of the present invention.

FIG. 7 is a longitudinal sectional view illustrating a configuration of the ultrasonic transducer according to Preferred embodiment 5 of the present invention. As illustrated in FIG. 7, in an ultrasonic transducer 500 according to Preferred embodiment 5 of the present invention, a housing 130 is defined only by a bottomed tubular section 132.

In the present preferred embodiment, a first acoustic transducer 110 and a second acoustic transducer 120 are bonded to each other using a known wafer bonding method such as, for example, metal bonding or anodic bonding. Specifically, a base section 111 and an annular section 121 are bonded to each other. When viewed from a thickness direction of a second membrane section 122, an area S20 of an outer shape of the second membrane section 122 of the second acoustic transducer 120 is larger than an area S10 of an outer shape of a first membrane section 112 of the first acoustic transducer 110.

In the present preferred embodiment, an ultrasonic transmission path T1 is a region surrounded by the first membrane section 112, the second membrane section 122, and the base section 111. Thus, a dimension of a length of the ultrasonic transmission path T1 is the same or substantially the same as a dimension of a thickness of the base section 111 having an annular shape that supports the first membrane section 112 while being in contact with an entire or substantially an entire periphery of the first membrane section 112.

In the ultrasonic transducer 500 according to Preferred embodiment 5 of the present invention, the length of the ultrasonic transmission path T1 can be shortened, so that the ultrasonic transducer 500 can be made highly efficient by reducing or preventing attenuation of ultrasonic waves.

In the ultrasonic transducer 500 according to Preferred embodiment 5 of the present invention, the housing 130 can be defined only of the bottomed tubular section 132 to reduce a length of the housing 130 while reducing the length of the ultrasonic transmission path T1, so that the ultrasonic transducer 500 can be miniaturized.

In the above description of the preferred embodiments, configurations that can be combined may be combined with each other.

It is understood that the preferred embodiments disclosed herein are exemplary in all respects and are not restrictive. The scope of the present invention is defined by the claims, not by the above description, and is intended to include all modifications within the meaning and range of equivalency of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic transducer comprising:

a first acoustic transducer including a first membrane section to perform flexural vibration;

a second acoustic transducer including a second membrane section facing the first membrane section and being spaced apart from the first membrane section, the second acoustic transducer being structured to vibrate in a thickness direction; and a housing with a bottomed tubular shape, the housing including a bottom portion facing the first membrane section and being spaced apart from the first membrane section in the thickness direction, and a surrounding wall portion surrounding the first membrane section and the second membrane section and being spaced apart from each of the first membrane section and the second membrane section; wherein the second acoustic transducer further includes an annular section supporting the second membrane section and being in contact with an entire or substantially an entire periphery of the second membrane section, and an acoustic matching plate facing the second membrane section and being spaced apart from the second membrane section, the acoustic matching plate being connected to the surrounding wall portion to define a sealed space with the housing;

an ultrasonic transmission path sandwiched between the first membrane section and the second membrane section is provided in the sealed space; and a maximum inner width of the ultrasonic transmission path is smaller than a maximum inner width of the surrounding wall portion.

2. The ultrasonic transducer according to claim 1, wherein the acoustic matching plate includes a recessed portion at a position facing the second membrane section.

3. The ultrasonic transducer according to claim 1, wherein the second membrane section and the annular section are defined by a common structure.

4. The ultrasonic transducer according to claim 1, wherein an area of an outer shape of the second membrane section is larger than an area of an outer shape of the first membrane section when viewed from the thickness direction.

5. The ultrasonic transducer according to claim 1, wherein a dimension of a length of the ultrasonic transmission path is the same or substantially the same as a dimension of a thickness of a base section including an annular shape and supporting the first membrane section while being in contact with an entire or substantially an entire periphery of the first membrane section.

6. The ultrasonic transducer according to claim 1, wherein the first acoustic transducer includes an oscillator made of a ceramic or an oscillator defined by a micro-electro-mechanical system.

7. The ultrasonic transducer according to claim 5, wherein the base section is made of Si or silicon on insulator.

8. The ultrasonic transducer according to claim 1, wherein the first membrane section is defined by a portion of a multilayer thin film.

9. The ultrasonic transducer according to claim 8, wherein the multilayer thin film includes PZT, AlN, lithium niobate, or lithium tantalate.

10. The ultrasonic transducer according to claim 1, wherein an inner diameter of the first membrane section is about 0.7 mm to about 1.0 mm.

11. The ultrasonic transducer according to claim 1, wherein an outer shape of the first membrane section is circular or substantially circular or rectangular or substantially rectangular.

12. The ultrasonic transducer according to claim 1, wherein the first membrane section includes a slit provided therein.

13. The ultrasonic transducer according to claim 12, wherein a width of the slit is about 10 μm or less.

14. The ultrasonic transducer according to claim 1, wherein the flexural vibration is performed in a frequency range of about 20 kHz to about 60 kHz.

15. The ultrasonic transducer according to claim 1, wherein the annular section of the second acoustic transducer includes a metal, a semiconductor, or a resin.

16. The ultrasonic transducer according to claim 1, wherein the annular section of the second acoustic transducer includes Si or Al.

17. The ultrasonic transducer according to claim 1, wherein the acoustic matching plate of the second acoustic transducer include Al or polypropylene.

18. The ultrasonic transducer according to claim 1, wherein the second acoustic transducer includes a micro-electro-mechanical system element including a mechanical oscillator.

19. The ultrasonic transducer according to claim 1, wherein the housing includes Al or polypropylene.

* * * * *